(12) United States Patent
Roche et al.

(10) Patent No.: US 9,897,004 B2
(45) Date of Patent: Feb. 20, 2018

(54) OIL DISCHARGE DEVICE AND TURBOMACHINE COMPRISING SUCH A DEVICE

(75) Inventors: Amandine Roche, Toulouse (FR); Jacques Rene Bart, Soisy sur Seine (FR); Gerard Philippe Gauthier, Champagne sur Seine (FR)

(73) Assignee: SNECMA, Paris (FR)

( * ) Notice: Subject to any disclaimer, the term of this patent is extended or adjusted under 35 U.S.C. 154(b) by 549 days.

(21) Appl. No.: 13/988,960

(22) PCT Filed: Nov. 25, 2011

(86) PCT No.: PCT/FR2011/052771
§ 371 (c)(1),
(2), (4) Date: May 22, 2013

(87) PCT Pub. No.: WO2012/069772
PCT Pub. Date: May 31, 2012

(65) Prior Publication Data
US 2013/0247538 A1  Sep. 26, 2013

(30) Foreign Application Priority Data
Nov. 26, 2010  (FR) ..................... 10 59816

(51) Int. Cl.
*F02C 7/06* (2006.01)
*F01D 25/18* (2006.01)
(Continued)

(52) U.S. Cl.
CPC ............... *F02C 7/06* (2013.01); *B01D 45/14* (2013.01); *F01D 9/065* (2013.01); *F01D 25/18* (2013.01);
(Continued)

(58) Field of Classification Search
CPC ...... F01D 25/16; F01D 25/162; F01D 25/164; F01D 25/166; F01D 25/168; F01D 25/18;
(Continued)

(56) References Cited

U.S. PATENT DOCUMENTS 2,609,065 A * 9/1952 Douglas .................. F01D 25/18
  184/6.11
5,201,845 A   4/1993 Allmon et al.
(Continued)

FOREIGN PATENT DOCUMENTS

EP   0 780 546   6/1997
EP   2 085 579   8/2009

OTHER PUBLICATIONS

International Search Report dated May 7, 2012 in PCT/FR11/052771 filed Nov. 25, 2011.

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A device for discharging oil from an oil chamber located in a downstream part of a gas turbine engine, the device including: a mechanism discharging at least part of the oil contained in the chamber to exterior of the engine; and a drive mechanism for driving the oil, which allows passage of an air flow that assists in driving the discharge of the oil to the exterior of the engine. The drive mechanism includes: a ventilation port in the downstream part of the engine, such that the oil passes through the ventilation port; and a guide element arranged such that, after the oil has passed through the ventilation port, the oil is directed towards a downstream bleed area of the low-pressure turbine. A turbomachine can include such an oil discharge device.

16 Claims, 4 Drawing Sheets

(51) Int. Cl.
  *B01D 45/14*  (2006.01)
  *F01D 9/06*  (2006.01)
  *F01D 25/20*  (2006.01)
  *F01D 25/16*  (2006.01)
  *F02C 7/14*  (2006.01)
  *F01D 25/22*  (2006.01)

(52) U.S. Cl.
  CPC ............ *F01D 25/183* (2013.01); *F01D 25/16* (2013.01); *F01D 25/162* (2013.01); *F01D 25/164* (2013.01); *F01D 25/166* (2013.01); *F01D 25/168* (2013.01); *F01D 25/186* (2013.01); *F01D 25/20* (2013.01); *F01D 25/22* (2013.01); *F02C 7/14* (2013.01); *F05D 2240/55* (2013.01); *F05D 2260/98* (2013.01); *F16N 2210/02* (2013.01); *Y02T 50/671* (2013.01)

(58) Field of Classification Search
  CPC ...... F01D 25/183; F01D 25/186; F01D 25/20; F01D 25/22; F01D 9/065; F01D 2240/55; F01D 2260/98; F16N 2210/02; F02C 7/06; F02C 7/14; F05D 2240/55; F05D 2260/98

USPC .......................................................... 415/112
  See application file for complete search history.

(56) References Cited

U.S. PATENT DOCUMENTS

| | | | |
|---|---|---|---|
| 5,776,229 A * | 7/1998 | Blanes | B01D 45/14 55/407 |
| 2006/0123795 A1* | 6/2006 | Fish | F01D 25/183 60/772 |
| 2007/0028590 A1* | 2/2007 | Bart | F01D 25/16 60/39.08 |
| 2007/0137221 A1* | 6/2007 | Charier | F01D 5/082 60/806 |
| 2008/0107522 A1* | 5/2008 | DiBenedetto | F01D 25/125 415/175 |
| 2009/0191046 A1 | 7/2009 | Bart et al. | |
| 2009/0199534 A1* | 8/2009 | Bart | F01D 25/16 60/39.08 |

* cited by examiner

_OIL DISCHARGE DEVICE AND TURBOMACHINE COMPRISING SUCH A DEVICE_

BACKGROUND OF THE INVENTION

Field of the Invention

The invention relates to the field of aeronautics and, more particularly, a device for discharging oil leaks from an oil chamber situated in the downstream part of a gas turbine engine.

Description of the Related Art

In gas turbine engines, the bearings, which are lubricated and cooled by oil, are contained in chambers the purpose of which is to prevent the oil from escaping into the engine. However, oil leaks in this region are frequent at low speed, because of the weak pressurizing of the seals at the extremities of the oil chambers. An oil leak may also occur if the chamber becomes flooded (for example if the oil pick up line becomes plugged, if the oil pick up pump fails, etc.).

In order to discharge the oil in the event of such a leak, it is known practice to use oil discharge means designed to allow at least some of the oil contained in the oil chamber to be discharged to the outside of the engine when the level in said chamber exceeds a threshold level. To make it easier to discharge the oil when such discharge is permitted, oil entrainment means are provided to allow through a stream of air the flow of which drives the discharge of the oil to the outside, for example by piercing the rotor shroud or flooding the oil sump (also known as "sump flooding").

These entrainment means may be of the "rotor shroud drillings" type. These make it possible, in the event of a leak, to guide the oily air as far as the turbine inner shroud. This oily air is expelled directly into the primary flow path under centrifugal action. This then results in the need to install special monitoring facilities (over temperature probes) in these zones to cover the risk of an oil fire if the walls near the oil leak (notably the turbine shrouds) can cause it to self-ignite.

In order to limit this shortcoming, patent document FR 2 926 738, by the SNECMA company, discloses a chamber flooding system (also referred to as a "sump flooding" system) which consists in equipping the entrainment means with a closure cowl, which is specifically ventilated and equipped with one or more orifices intended to discharge the air (or the oily air in the event of an oil leak) into the sheet metal cone (referred to as a "plug") and then to the ambient surroundings via an opening in said plug. Thus, the oily air bled from the compressor is rejected directly to outside the engine.

However, the abovementioned earlier technique does have the disadvantage of requiring a significant additional mass, because of the closure cowl and the various orifices. Furthermore, the air intended to ventilate the closure cowl works in the turbine in all phases of flight, contributing to a drop in engine efficiency.

BRIEF SUMMARY OF THE INVENTION

It is an object of the invention to remedy these disadvantages and the invention therefore proposes a device for discharging oil leaks, with cowling, which is more lightweight and allows the oil to be discharged without the stream of air needed for discharge being directly lost, while at the same time carrying less of a penalty in terms of mass and engine performance than a "sump flooding" system.

The invention also proposes that this device for discharging oil leaks, under operating conditions, should not present any ventilation constraints connected with the risks of fire (conditions likely to cause an oil fire).

To this end, according to the invention, the device defined above for discharging oil from an oil chamber situated in the downstream part of a gas turbine engine, this device comprising:

oil discharge means designed to allow at least some of the oil contained in the chamber to be discharged to outside the engine when the level in said chamber exceeds a threshold level, and oil entrainment means able to allow through a stream of air the flow of which contributes to driving the discharge of oil to outside said engine, is notable in that the entrainment means comprise:

a vent orifice made in the downstream part of said engine so that the oil takes said orifice, and a guide element arranged so that the oil, having taken said vent orifice, is directed toward the downstream bleed zone of the low-pressure turbine.

It will be appreciated that the oil is discharged to outside the engine not only by the aforementioned entrainment means but also under the effect of gravity and the centrifugal effect of the spinning of the oil on stator and rotor walls respectively.

Thus, by virtue of the invention, the air used to entrain the oil in the event of a chamber leak outside of the engine is not directly lost because it performs a dual role. Specifically, in addition to entraining the oil, the stream of air is directed toward the downstream bleed zone of the low-pressure turbine. There, this stream performs an over pressurizing role which prevents the air from the primary flow path of the engine from being re-ingested at the point of disk-blading attachment of the turbine impeller, at the risk of opening up the attachment and freeing the blading. Thus, the bleed flow rate initially provided may be limited by adding this stream of air to it so that the bleeds from the compressor can be limited and engine efficiency improved.

Furthermore, again thanks to the invention, the entrainment of the oil to outside the engine is, to a large extent, performed through a carefully located vent orifice and a guide element. The mass of the engine fitted with a device according to the invention is therefore increased by the guide element, but on the other hand, it is reduced by the material from which the vent orifice is formed and the tubes connecting the cavity under the cowling of the plug, thus making the engine lighter overall.

What is more, it will be noted that the invention does indeed allow excess oil to be eliminated because this oil now flows, under gravity and under the effect of the stream of air, toward the low point of the engine, therefore to the low-pressure turbine bleed zone where it is discharged toward the rear of the engine, thereby avoiding oil being introduced into cavities where the aerothermal environment is likely to create and sustain an oil fire. No fire detection system need be fitted (contrary to the case with the "shroud drilling" type of system) because there is no wall in the path followed by the oil that would allow the oil to self-ignite.

For preference, the guide element is a cowling attached to the downstream part of the engine. This cowling makes it possible to avoid oil being present upstream of the final disk of the low-pressure turbine.

In this case, according to various alternative forms of the invention, the extent of the cowling may cover:

substantially the path leading from the vent hole to the downstream bleed zone of the low-pressure turbine, so as to provide optimal guidance for the oil and the stream of air; or essentially the vicinity of the vent hole, in order to minimize the mass of the engine.

Still in the case of a guide element in the form of a cowling, the latter may have an at least partially circumferential profile (so that it encircles the oil and the stream of air) or, alternatively, an at least substantially planar profile.

In order to adapt the oil discharge device according to the invention to suit the quantity of oil that needs to be discharged when a chamber floods, provision may be made for the dimension of the vent hole to be adapted to suit the flow rate of oil to be discharged or to the flow rate of air it is to admit if operating without an oil leak.

The downstream part of the engine generally comprises a downstream stator element and a low-pressure turbine rotor element respectively connected to one another. In this case, the oil chamber is advantageously made in the downstream stator element.

In this case likewise, the discharge means are preferably arranged at a first zone of sealing connecting the downstream stator element and low-pressure turbine rotor element so that the oil is discharged toward the low-pressure rotor element, it being possible for this discharge to occur under the effect of gravity so that the oil that is to be discharged is conveyed as far as the low-pressure turbine rotor element, and also under the effect of the flow of air.

For preference, the vent hole is made in the downstream stator element, so as to make it possible to create a path between the oil chamber and the bleed zone.

For preference also, the entrainment means further comprise a configuring of the low-pressure rotor element, in a second zone of sealing between the downstream stator element and low-pressure rotor element respectively, so that the air and/or the oil is directed toward the vent orifice. This configuring—for example in the form of a slope—makes it easier to guide the oil toward the vent hole, this making it possible to avoid oil-retaining volumes.

The invention also relates to a turbomachine comprising an oil discharge device according to one of the above embodiments.

BRIEF DESCRIPTION OF THE SEVERAL VIEWS OF THE DRAWINGS

The invention will be better understood with the aid of the attached drawing in which.

DETAILED DESCRIPTION OF THE INVENTION

To make the figures easier to understand, identical numerical references will denote similar technical elements.

Figure 1:
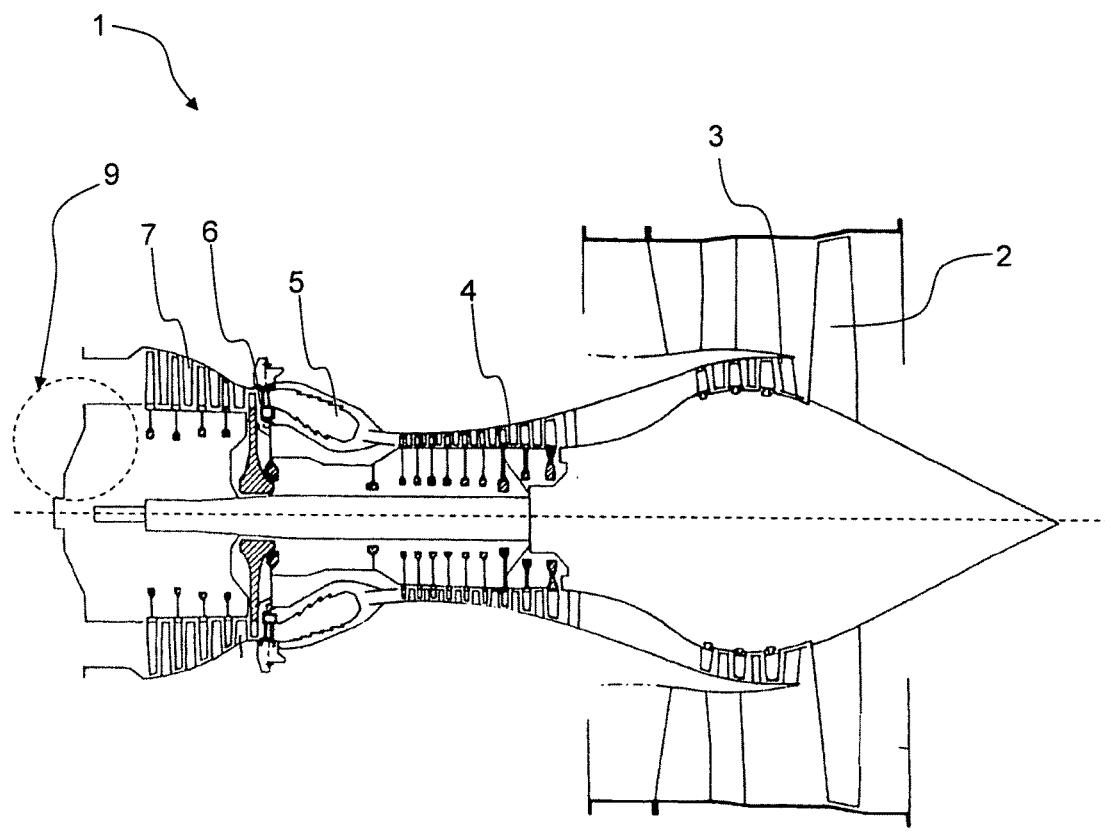
FIG. 1 is a view in cross section of a gas turbine engine in which the oil discharge device according to the invention may be installed.

FIG. 1 schematically depicts an overview of a gas turbine engine, for example an aircraft bypass turbojet engine. This engine 1 comprises, from front to rear, a fan 2, a low-pressure compressor 3, a high-pressure compressor 4, a combustion chamber 5, a high-pressure turbine 6 and a low-pressure turbine 7. The downstream part of the engine (which part is depicted in greater detail in FIG. 2), in the region of which the oil discharge device according to the invention is installed, is denoted by the reference 9.

Figure 2:
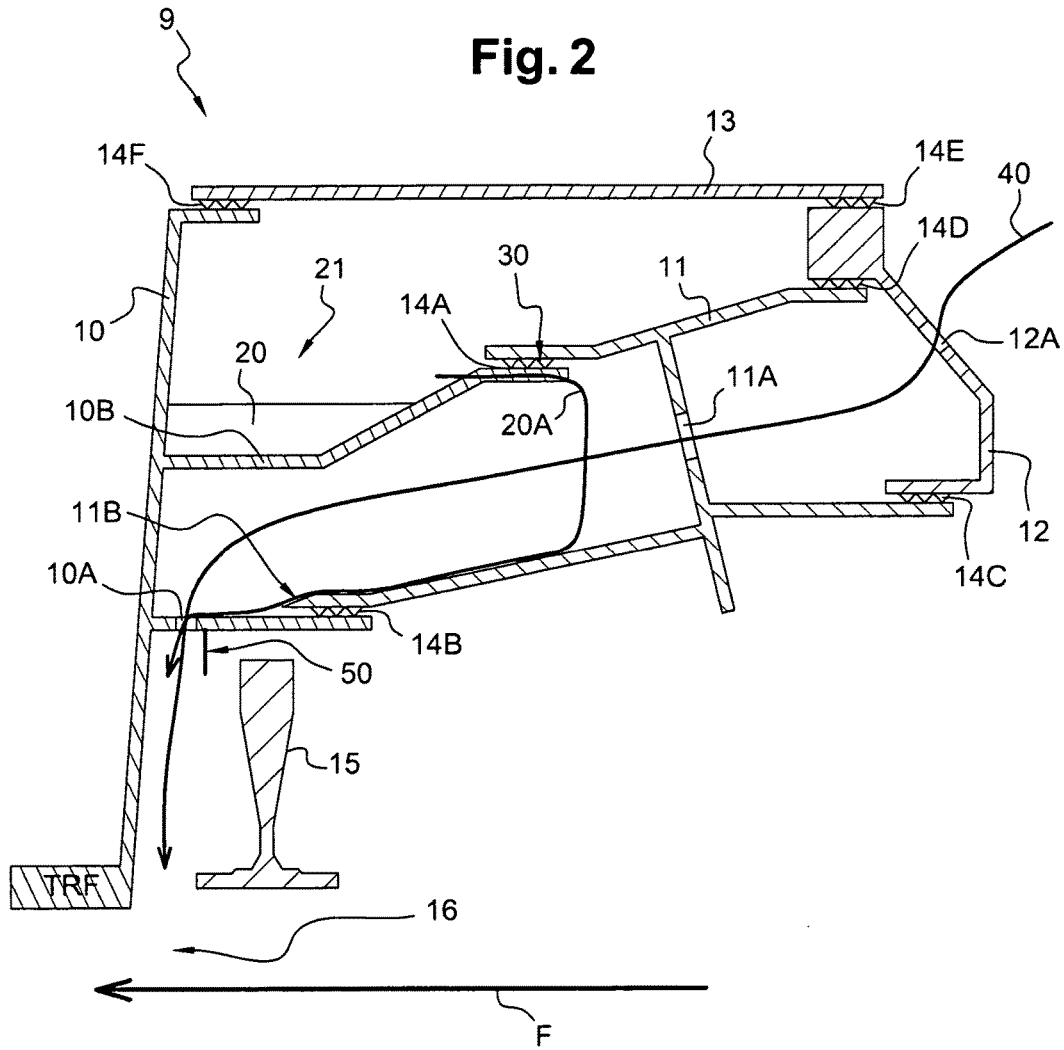
FIG. 2 is a diagram illustrating the layout of the oil discharge device according to the invention in the downstream part of the engine, according to a first embodiment.

FIG. 2 schematically depicts a downstream stator element 10, connected notably to an element 11 connected to the low-pressure rotor, these two components 10 (casing) and 11 (low-pressure rotor) being interfaced with one another at two air-oil seals 14A and 14B.

The downstream part 9 of the engine 1 further comprises a component 12 connected to the high-pressure rotor, and also connected to the component 11 via seals 14C and 14D, and finally a cover piece 13, connected to the components 10 and 12, likewise via seals 14E and 14F.

In the region of a top part of the downstream stator component 10, there is formed an oil chamber 21 which delimits one or more successive bearings of the engine (these have not been depicted). These bearings are lubricated by a flow of oil coming from a nozzle in this chamber. The rotating of these bearings generates an oil mist which fills the chamber 21, the latter moreover being delimited by a pressurized chamber cap (10B).

In order to discharge at least some of the oil 20 contained in the oil chamber 21, the oil discharge device according to the invention is designed to direct the oil 20 toward a low point in the engine, this low point more specifically corresponding to a bleed zone 16 of the final disk 15 of the low-pressure turbine.

The oil discharge device first of all comprises discharge means in the form of a rotor-stator set 30, formed by a first seal 14A between the downstream stator element 10 and the low-pressure turbine rotor element 11, which seal is located at a predetermined level in comparison with the level of the oil chamber 21. The level of these discharge means 30 (or sealing zone) is chosen so that at least some of the oil 20 contained in the chamber 21 can be discharged to outside the engine—particularly the lower part thereof—when the level in said chamber 21 exceeds a threshold level corresponding to the level of the seal 14A. In this way, oil can be discharged only if the oil level in the chamber 21 is deemed to be too high, with respect to the risks of an oil leak caused by the flooding of a chamber or a lack of pressurizing.

Set out in this way, the discharge means 30 allow the excess oil in the low point of the engine 20A to be discharged through the seal 14A, then spun out on the component 11 connected to the low-pressure turbine rotor.

Moreover, the oil discharge device according to the invention also comprises oil entrainment means which duct the air and partially entrain the oil toward the bleed zone 16 of the final disk 15 of the low-pressure turbine in the event of a chamber leak, this corresponding to the zone toward which it is desired that this excess oil 20A be ducted.

These entrainment means notably comprise two orifices (or series of holes) 11A and 12A, made respectively in the components 11 and 12, these orifices being positioned in such a way that a stream 40 of air can circulate through the intermediate zone between the discharge means 30 and the lower part of the low-pressure turbine rotor component 11, this zone being the zone into which the excess oil 20A is intended to flow under the effect of gravity. This stream of air 40, itself entrained by injection means (which have not been depicted in FIG. 2), allows the oil 20A to be entrained along the lower part of the component 11, in the downstream direction of the engine. Under normal engine operation, these drillings allow the air 40 to be circulated toward the bleed zone 16. The oil 20A is also entrained along the component 11 through a centrifugal effect.

Here, and in all of this patent, "upstream" and "downstream" respectively mean the front and rear parts of the engine 1, with reference to the direction of the stream of air passing through said engine, which direction is indicated by the arrow F in FIG. 2.

Thus, the oil 20A flows along the component 11, in the downstream direction, and reaches the component 10, via the second seal 14B between said components 10 and 11. To encourage this flow, there may be some configuring 11B on the wall of the component 11 over which the oil 20A flows, in the region of the zone of connection between the components 10 and 11. This configuring may take the form of a determined slope such that the oil slides along this slope and is thus preferably ducted toward the downstream stator component 10. In the same way, the component 10 may be sloped so that the oil slides along this slope and is thus conveyed preferably toward the orifice 10A.

A vent orifice (or hole) 10A (which forms part of the oil entrainment means), toward which the oil is entrained by the stream 40 of air (and the slope, if any, in the component 10 in the vicinity of the hole) is made in the component 10. This orifice 10A may, for example, be circular, with a diameter chosen according to the flow rate (determined beforehand) of oil to be discharged.

The excess oil 20A and the stream 40 of air, the path of which is described hereinabove, then take this orifice 10A to reach the lower part of the engine 1 (the oil being entrained under the effect of gravity and of the stream 40 of air), and more particularly the zone 16 situated near and downstream of the final disk 15 of the low-pressure turbine. The oil 20A and the stream 40 of air are thus discharged from the engine as a result of the force exerted by the thrust of the engine, in the direction of the arrow F.

To make this discharge toward the zone 16 easier, according to the invention the entrainment means also comprise a cowling 50, attached to the stator component 10, at least partially around the vent orifice 10A. This cowling serves to guide the oil in such a way that this oil is preferably ducted toward the zone 16. Thus, while the oil is actually discharged, the stream 40 of air can generate an overpressure in the bleed zone 16, so as to prevent air that has passed through the engine in the direction of the arrow F from entering the zone downstream of the disk 15, as this could have the result of generating in this zone turbulence liable to impair the aerodynamic performance of the engine 1 and damage the disk/blading attachment of the final low-pressure turbine impeller 15.

The oil discharge device thus works as follows:
in normal operation, there is no excess oil and the stream 40 of air passes in succession through the holes 12A, 11A and 10A in order to generate an overpressure in the zone 16, so as to bleed this zone;
in the event of an oil leak (caused for example by weak pressurizing of the oil chamber 21 at low speed, or if a chamber 21 is flooded), the excess oil 20A flows, via the rotor-stator clearances 30 and under the effect of gravity, to a zone where it is entrained by a centrifugal effect onto the rotor 11 and the stream 40 of air as far as the vent orifice 10A, then as far as the lower part of the engine where it is discharged.

As a result of the foregoing, it is apparent that the oil is thus directed toward a zone that does not have ventilation and temperature conditions likely to cause a fire, without thereby impairing engine performance. In addition, the stream 40 of air has a dual role: that of entraining the excess oil out of the engine (in the event of an oil leak) and that of bleeding the downstream part 16 of the low-pressure turbine (continuously), thus optimizing both the use of this air stream 40 and its contribution to engine efficiency.

It will be appreciated that it is preferable, as far as possible, for the entrainment means of the oil discharge device according to the invention to be positioned as close as possible to the downstream stator component 10, as this allows all of the oil to be redirected into the primary flow path without a fire risk.

Figure 3:
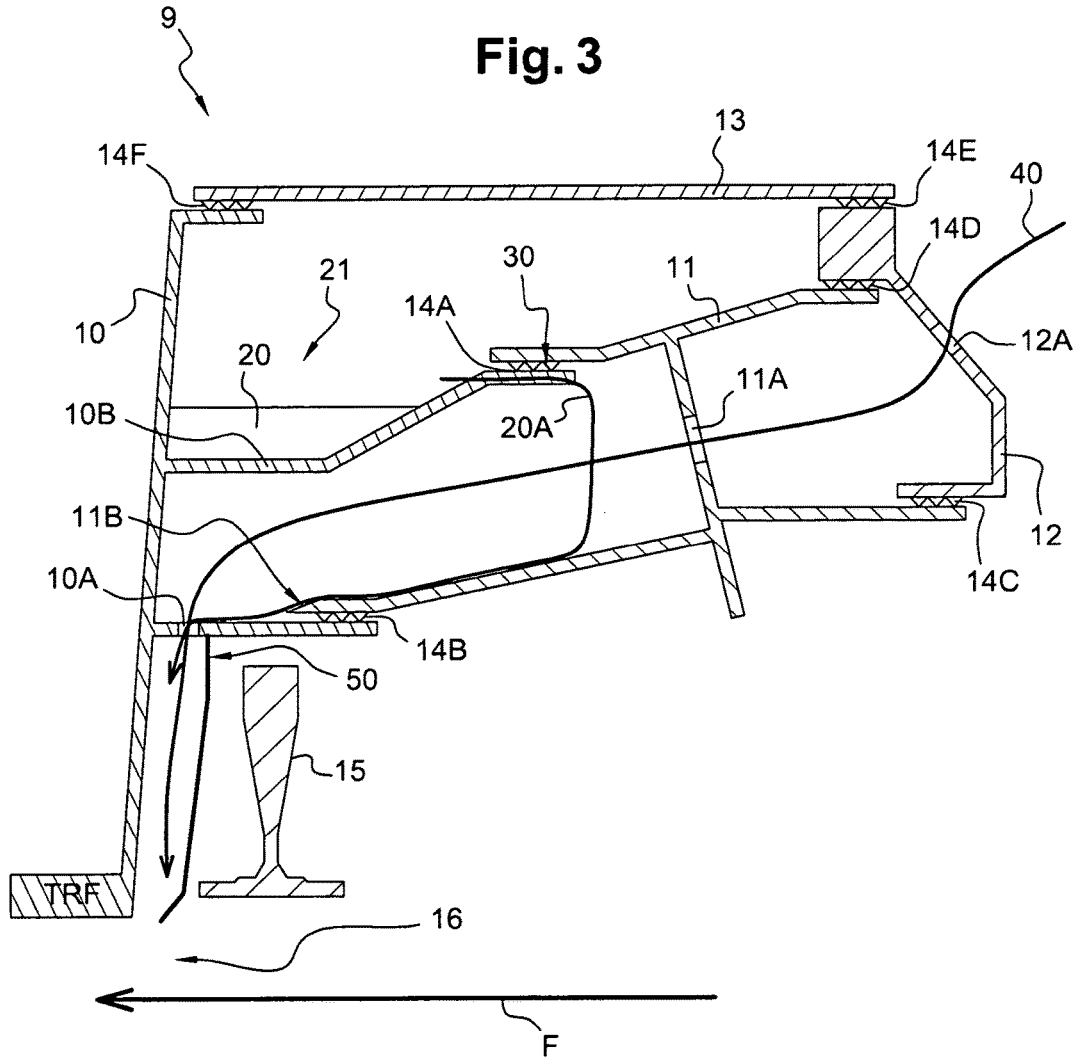
FIG. 3 is a diagram illustrating the layout of the oil discharge device according to the invention in the downstream part of the engine, according to a second embodiment.

As depicted in the profile view of FIG. 2, the (short) cowling 50 may be arranged in such a way that its extent covers essentially the vicinity of the vent orifice 10A, allowing the oil 20A and the stream 40 of air to be guided in the vicinity of said orifice 10A without by the same token excessively increasing the weight of the engine. According to a second embodiment of the invention which has been depicted in FIG. 3, the (long) cowling 50 may be arranged in such a way that its extent covers substantially the path leading from the vent hole 10A to the downstream bleed zone 16 of the low-pressure turbine, so as to afford optimum guidance to the oil and the stream of air, and also so that the flow of oil is as close as possible to the downstream bleed zone 16 of the low-pressure turbine.

Figure 4A:
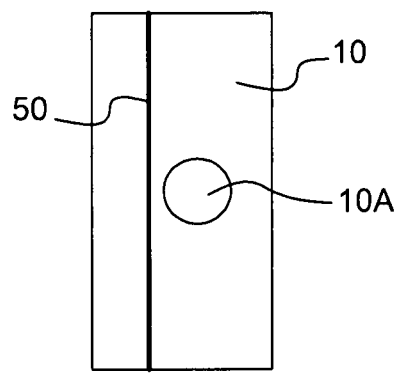
FIG. 4 illustrates various alternative forms of embodiment of the guide element incorporated into the oil discharge device according to the invention.
Figure 4B:
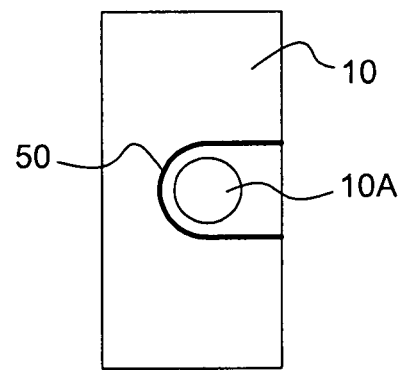

The diagrams 4A and 4B in FIG. 4, which depict the cowling 50 viewed from above, illustrate two alternative forms of embodiment thereof, not in terms of extent (these variants can be applied with equal preference to a long cowling or a short cowling) but in terms of shape. In the variant of diagram 4A, the cowling 50 is made of a flat sheet made of the same material as the downstream stator element 10. In the variant of diagram 4B, the cowling 50 is formed of a semi-circumferential trough incorporated into the component 10.

In both instances, it will be appreciated that the guide element 50 needs to be thick enough that it does not deform under engine operating conditions.

The guide element 50 may also be completely incorporated into the component 10 in order to minimize the additional mass of assembling the components 10 and 50 (the mass of nuts and bolts).

The invention claimed is:
1. A turbomachine comprising an oil discharge device situated in a downstream part of the turbomachine, the oil discharge device including:
an oil discharge system configured to allow at least some of the oil contained in the oil chamber to be discharged to outside the turbomachine when a level in the oil chamber exceeds a threshold level; and
an oil entrainment device configured to allow therethrough a stream of air with a flow which contributes to driving the discharged oil to outside the turbomachine, wherein the oil entrainment device comprises:
a vent opening made in the downstream part of the turbomachine so that the discharged oil passes through the vent opening, and
a guide element arranged so that the discharged oil, having passed through the vent opening, is directed toward a downstream bleed zone of a low-pressure turbine, the vent opening opening out to the downstream bleed zone, and the downstream bleed zone being situated adjacent to and downstream of a final disk of the low-pressure turbine to avoid oil being present upstream of the final disk of the low-pressure turbine, wherein the downstream part comprises a stationary downstream stator element and a rotatable low-pressure turbine element respectively connected to one another, wherein the downstream bleed zone is situated upstream of an extremity of the stationary downstream stator element that is located on a side of the downstream bleed zone, wherein the oil discharge system comprises a configuring of the stationary downstream stator element and the rotatable low-pressure turbine element to form a first zone of sealing between the stationary downstream stator element and the rotatable low-pressure turbine element so that the oil is discharged toward the rotatable low-pressure turbine element, wherein, when the level in the oil chamber does not exceed the threshold level, the stream of air passes through the vent opening into the downstream bleed zone so as to generate an overpressure in the downstream bleed zone, and wherein the vent opening is defined by the stationary downstream stator element, an axis of the vent opening extending in a radial direction perpendicular to a longitudinal axis of the turbomachine.

2. The turbomachine as claimed in claim 1, wherein the oil is discharged to outside the turbomachine under an effect of gravity and a centrifugal effect of the spinning of the oil on stator and rotor walls respectively.

3. A device for discharging oil from an oil chamber situated in a downstream part of a gas turbine engine, the device comprising:

an oil discharge system configured to allow at least some of the oil contained in the oil chamber to be discharged to outside the gas turbine engine when a level in the oil chamber exceeds a threshold level; and an oil entrainment device configured to allow therethrough a stream of air with a flow which contributes to driving the discharged oil to outside the gas turbine engine, wherein the oil entrainment device comprises:

a vent opening made in the downstream part of the gas turbine engine so that the discharged oil passes through the vent opening, and a guide element arranged so that the discharged oil, having passed through the vent opening, is directed toward a downstream bleed zone of a low-pressure turbine, the vent opening opening out to the downstream bleed zone, and the downstream bleed zone being situated adjacent to and downstream of a final disk of the low-pressure turbine to avoid oil being present upstream of the final disk of the low-pressure turbine, wherein the downstream part comprises a stationary downstream stator element and a rotatable low-pressure turbine element respectively connected to one another, wherein the downstream bleed zone is situated upstream of an extremity of the stationary downstream stator element that is located on a side of the downstream bleed zone, wherein the oil discharge system comprises a configuring of the stationary downstream stator element and the rotatable low-pressure turbine element to form a first zone of sealing between the stationary downstream stator element and the rotatable low-pressure turbine element so that the oil is discharged toward the rotatable low-pressure turbine element, wherein, when the level in the oil chamber does not exceed the threshold level, the stream of air passes through the vent opening into the downstream bleed zone so as to generate an overpressure in the downstream bleed zone, and wherein the vent opening is defined by the stationary downstream stator element, an axis of the vent opening extending in a radial direction perpendicular to a longitudinal axis of the gas turbine engine.

4. The device as claimed in claim 3, wherein the guide element includes a cowling attached to the downstream part of the gas turbine engine.

5. The device as claimed in claim 4, wherein an extent of the cowling covers substantially a path leading from the vent opening to the downstream bleed zone of the low-pressure turbine.

6. The device as claimed in claim 4, wherein the cowling has an at least substantially circumferential profile.

7. The device as claimed in claim 3, wherein dimensions of the vent opening are configured to suit a flow rate of the discharged oil.

8. The device as claimed in claim 3, wherein the oil chamber is defined in part by the stationary downstream stator element.

9. The device as claimed in claim 8, wherein the vent opening is made in the stationary downstream stator element.

10. The device as claimed in claim 9, wherein the oil entrainment device further comprises a configuring of the rotatable low-pressure turbine element, in a second zone of sealing between the stationary downstream stator element and rotatable low-pressure turbine element respectively, so that at least one of the air and the discharged oil is directed toward the vent opening.

11. The device as claimed in claim 3, wherein the guide element extends radially.

12. The device as claimed in claim 4, wherein the cowling is a flat sheet, and a material of the cowling is the same as a material of the stationary downstream stator element.

13. The device as claimed in claim 4, wherein the cowling is a semi-circumferential trough incorporated into the stationary downstream stator element.

14. The device as claimed in claim 3, wherein the oil is discharged to outside the gas turbine engine under an effect of gravity and a centrifugal effect of the spinning of the oil on stator and rotor walls respectively.

15. The device as claimed in claim 3, wherein the vent opening is disposed rearward of the final disk of the low-pressure turbine.

16. The device as claimed in claim 3, wherein the vent opening is positioned radially inward of the final disk of the low-pressure turbine.

* * * * *